March 20, 1962 — G. E. OPEL — 3,025,898
SAFETY WHEEL RIM
Filed Dec. 5, 1960 — 2 Sheets-Sheet 1
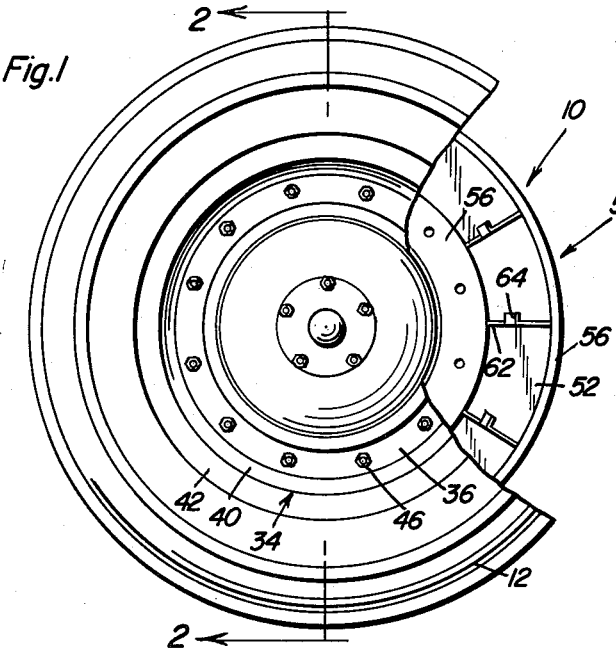
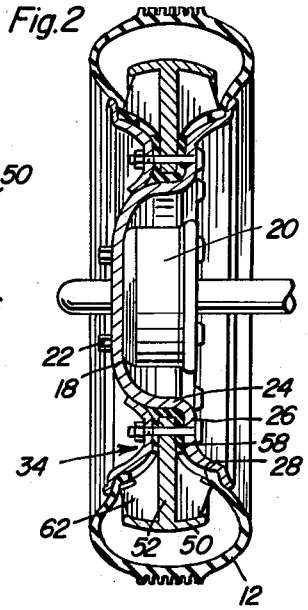
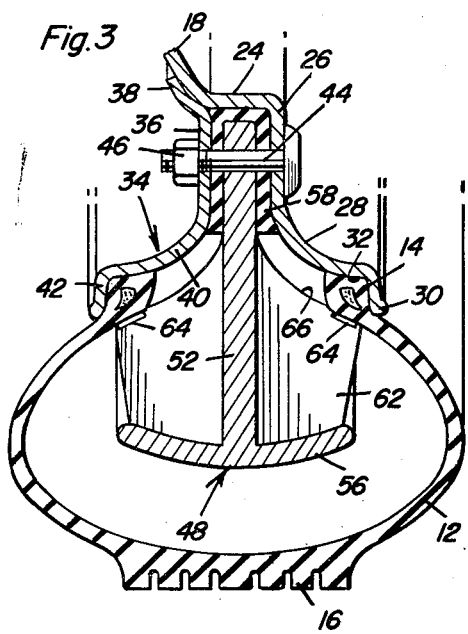
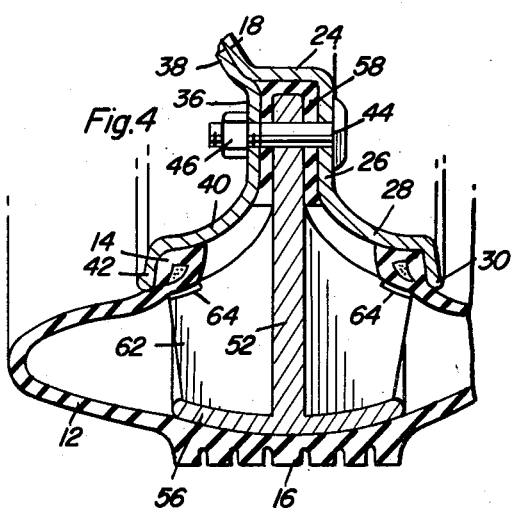
George E. Opel
INVENTOR.

March 20, 1962 G. E. OPEL 3,025,898
SAFETY WHEEL RIM
Filed Dec. 5, 1960 2 Sheets-Sheet 2
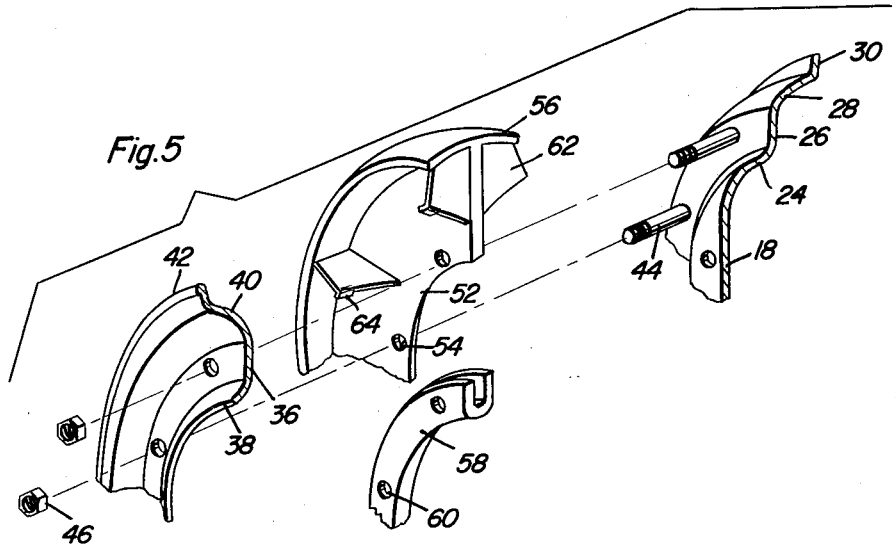
Fig.5
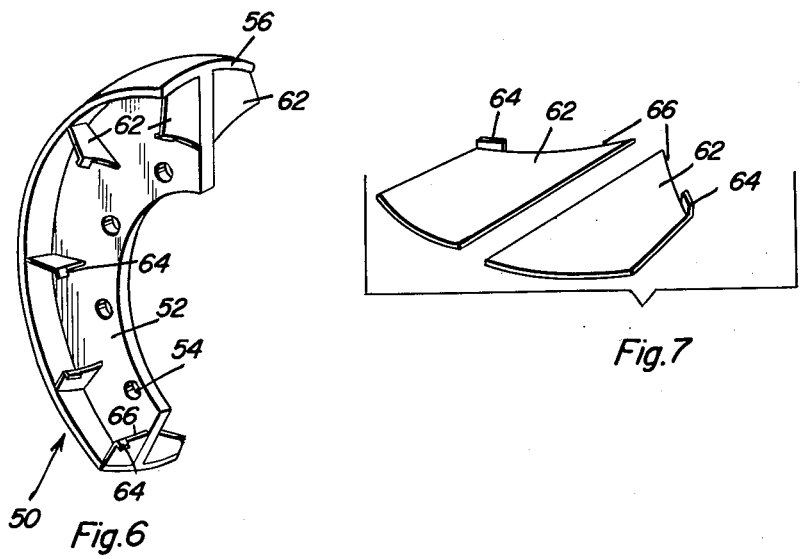
Fig.6
Fig.7
George E. Opel
INVENTOR.
BY *Clarence A. O'Brien*
*and Harvey B. Jacobson*
Attorneys ent invention incorporated therein;
United States Patent Office
3,025,898
Patented Mar. 20, 1962

3,025,898
SAFETY WHEEL RIM
George E. Opel, 4031 Kottler Drive, Lafayette Hill, Pa.
Filed Dec. 5, 1960, Ser. No. 73,642
11 Claims. (Cl. 152—158)

The present invention generally relates to a wheel construction and more particularly a safety rim or wheel construction for automotive vehicles.

One of the primary causes of vehicle accidents is loss of control of the vehicle due to tire blow-outs. When a tire is suddenly deflated, the vehicle will quite often be thrown out of control since the vehicle will actually then be supported on the rim and the deflated tire. Therefore, it is the primary object of the present invention to provide a safety rim construction incorporating novel structural features providing support for the vehicle when a tire becomes deflated thereby eliminating loss of control of the vehicle and the consequences of such loss of control.

Another object of the present invention is to provide a safety rim construction in accordance with the preceding object in which the safety rim structure is disposed completely within the interior of the tire and does not effect the normal operation of the tire.

One reason for loss of control of the vehicle is the actual separation of the tire and rim, that is, the tire becomes loose on the rim and actually flops around on the rim thus resulting in damage to the tire and also tending to sway or pull the vehicle out of control. Thus, it is another important object of the present invention to provide a safety tire rim structure which will effectively lock the beads of the tire to the rim to prevent separation thereof even though the tire may be deflated.

Still another important object of the present invention is to provide a safety tire rim which incorporates a novel structural feature for enabling separation of the two flanges of the rim for ease of replacement of the tire inasmuch as this structure does not require the use of various tools generally known as tire irons which are required for normally removing a tire from a wheel rim.

Still another important object of the present invention is to provide a safety wheel rim construction that does not sacrifice any riding comfort and does not require any modification of present tubeless tires. The present invention will actually enable the use of four tires and rims on a vehicle instead of the normally provided five tires and tubes, one being employed for a spare. The present invention enables the deflated tire to be driven over relatively long distances without damage to the tire thus eliminating the necessity of a spare tire since the vehicle may be driven to the nearest tire repair station without damage to the tire.

Still other objects of the present invention reside in its simplicity of structure, convenience of use, ease of operation, safety in use and its inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a vehicle tire and rim assembly illustrating the novel rim of the present invention incorporated therein;

FIGURE 2 is a vertical sectional view taken substantially upon a plane passing along section line 2—2 of FIGURE 1 illustrating the details of construction of the invention;

FIGURE 3 is a detailed sectional view of the safety wheel rim with the tire inflated;

FIGURE 4 is a sectional view similar to FIGURE 3 but with the tire deflated illustrating the safety wheel rim in operation;

FIGURE 5 is a group perspective view of the components of the safety wheel rim illustrating the manner in which they are assembled;

FIGURE 6 is a perspective view of one of the segments of the safety wheel rim illustrating the structure thereof; and FIGURE 7 is a perspective view of a pair of reinforcing flanges used in constructing the segment of FIGURE 6 and illustrating specifically the tire bead engaging lips.

Referring now specifically to the drawings, the numeral 10 generally designates the safety wheel rim of the present invention which is employed in combination with a conventional tubeless tire 12 having the usual beads 14 thereon and the usual tread surface 16. The construction of the tire 12 is not important to the present invention and the present invention is intended for use with conventional tubeless tires presently available on the commercial market.

The safety wheel rim 10 of the present invention includes a center disk 18 of any desired particular configuration for mounting on and engagement with a brake drum or spindle 20 with the usual lugs 22 being employed for retaining the center disk 18 in position. The lug pattern is variable for conforming with the lay-out of the lug bolts on the brake drum or spindle and the concavity on the interior of the center disk 18 may vary depending upon the shape, size and configuration of the brake drum, spindle or the like.

The center disk 18 includes a generally cylindrical peripheral portion 24 at the outer edge of the concave section. Extending radially outwardly of and peripherally of the cylindrical section or portion 24 is an annular flange 26 substantially perpendicular to the axis of rotation of the wheel. The flange 26 merges into an outwardly flared flange 28 having a slightly convex inner surface and a slightly concave outer surface. The flange 28 terminates in a smaller angulated flange 30 which may be considered a bead engaging flange and the flange 30 is provided with a concave outer surface and a convex inner surface. The inner surface of the flange 30 and the annular recess 32 defined by the juncture between the flanges 28 and 30 forms a seat for receiving the bead 14 of the tire 12.

The other bead 14 of the tire 12 is engaged by a similarly shaped removable flange generally designated by numeral 34 which includes a radial flange 36 parallel to and spaced from the radial flange 26. The inner edge of the radial flange 36 is provided with an upwardly and an outwardly inclined flange 38 disposed against the edge portion of the center disk 18. The outer edge of the flange 36 is provided with an outwardly curved flange 40 similar to the flange 28 in curvature, shape and size. The flange 40 terminates in a peripheral flange 42 also outwardly flared at a slightly different angle than the flange 40. Flange 42 is equivalent to the flange 30 in shape, size and purpose in that it also engages the bead 14 of the tire 12.

For retaining the removable flange 34 mounted on the safety wheel rim, there is provided a plurality of headed bolts 44 extending through the flanges 26 and 36 respectively, the bolts being provided with nuts 46 for retaining the removable flange 34 in position.

Disposed interiorly of the tubeless tire 12 is an annular segmental member generally designated by numeral 48. The annular member 48 forms a supporting member for the wheel in the event of deflation of the tire 12 and is constructed of three segments, each segment extending for 120 degrees. A segment of the annular member 48 is illustrated in FIGURE 6 and is generally designated by reference numeral 50. As illustrated, each segment 50 includes a radially extending flange 52 having a plurality of circumferentially spaced holes or apertures 54 for receiving the bolts 44. The outer edge of the flange 52 is provided with a transverse flange 56 that is rounded slightly generally to conform to the curvature of the interior of the tire tread 16. The outer surface of the flange 56 is slightly convex and the edges thereof rounded while the inner surface of the flange 56 is slightly concave.

For assembling with the wheel disk 18, flange 26 and removable flange 34, the flange 52 is disposed in an annular gasket or sealing member 58 U-shaped in cross-sectional configuration and provided with a plurality of circumferentially spaced openings or holes 60 for receiving the bolts 44. The annular seal 58 is in the form of a rubber gasket and receives the inner edge of the flange 52 and engages the inner surface of the flange 24 and the inner surface of the flange 36 so that when the bolts 44 and nuts 46 are tightened, the segments 50 are not only secured in position but this area of the flange is effectively sealed from leaking air. Further, the resiliency of the material from which the gasket 58 is constructed will serve somewhat to cushion the flange 52 in the event of any lateral defecting forces being exerted thereon when the device is used with the tire deflated.

Each segment 50 is provided with a plurality of reinforcing gussets or flanges 62 attached to the inner surface of the transverse flange 56 and the adjacent surface of the flange 52 thus reinforcing the flange 56. Each stiffening flange or gusset 62 is provided with a laterally extending lip 64 on what may be considered the inner edge 66 which is inclined outwardly and away from the inner edge of the flange 52. The lips 64 engage the inner surface of the bead 14 thereby effectively locking the bead to the rim and preventing separation of the bead from the safety wheel rim.

When the tire 12 is inflated, the safety wheel rim serves no particular purpose but does not affect the operation of the tire in the usual manner. Of course, in the event of any excessive deflection of the tread surface of the tire, such excessive deflection will be arrested by or prevented by the safety wheel rim segments 50. In the event of complete deflation of the tire, the conditions existent in FIGURE 4 will prevail in which event the transverse flange 56 and especially the outer surface thereof is engaged in such a manner that the segments 50 serve to support the center disk and of course the vehicle. This enables the vehicle to be run over the road without damage to the tire and also facilitates removal of tires by virtue of being able to remove the removable flange 34 and the segments 50 thus enabling the tire to be readily disassembled or assembled onto the safety wheel rim of the present invention.

In effect, the safety segment becomes a solid metal wheel when the tire is punctured or otherwise deflated, the solid metal wheel actually engaging the inner surface of the tire which forms a rubber cushion for the metal wheel. This enables the safety wheel rim of the present invention to be driven for considerable distance without damaging the tire. The segments of the wheel rim are arranged in this manner for ease of assembly although it is within the purview of the present invention to provide a continuous annular inner wheel rather than a segmental inner wheel as illustrated.

The inner wheel segments may be constructed of various materials and may be either a welded structure or a cast structure, preferably constructed of some lightweight alloy.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety wheel construction for vehicles comprising an annular flange disposed within the confines of a pneumatic tire, the inner peripheral edge portion of the flange being secured to the tire mounting rim, the outer edge portion of the flange being disposed radially adjacent the center of the tire, and a transverse flange rigid with the outer edge of the annular flange thereby forming a continuous metal tire for engagement with the inner surface of the pneumatic tire when the pneumatic tire is deflated whereby the metal tire will support the weight of a vehicle and be cushioned by its engagement with the inner surface of the deflated pneumatic tire, said annular flange and transverse flange being peripherally segmental for ease of assembly thereof, each segment of the flanges including a plurality of reinforcement flanges perpendicular to the annular flange and being rigidly secured to the inner surface of the transverse flange for reinforcing the transverse flange, each reinforcing flange having a peripherally extending lip on the outer inner edge thereof for engagement with the inner surface of the beads of a pneumatic tire for retaining the beads against the flanges of a rim thereby preventing separation of the beads from the flanges when the pneumatic tire is deflated thereby enabling the deflated pneumatic tire to be driven over the road for relatively long distances without damage to the tire.

2. The structure as defined in claim 1 together with an annular sealing gasket having a transverse U-shaped cross-sectional configuration engaging with and receiving the inner edge portion of the annular flange for sealing the annular flange to the wheel rim.

3. A safety wheel rim comprising a center disk for mounting on a vehicle axle assembly, an inner pneumatic tire engaging flange rigid with the center disk, a separate tire engaging flange, means securing the separate tire engaging flange removably to the tire engaging flange integral with the center disk, said separate tire engaging flange including an inner edge portion engaging the center disk and an outer edge portion engaging the tire, both of said tire engaging flanges having parallel portions, an annular flange disposed between the parallel portions of the tire engaging flanges and extending radially outwardly thereof with the outer edge of the annular flange terminating within the confines of a pneumatic tire, means extending through the tire engaging flanges and the annular flange for retaining all the flanges in rigid assembled relation, and a transverse flange rigid with the outer edge of the annular flange for engagement with the inner surface of the tread portion of a tire when the tire becomes deflated thereby forming a support for a vehicle and preventing loss of control of the vehicle normally resulting from a blow-out, each reinforcing flange being provided with a laterally extending lip on the inner edge thereof disposed in opposed relation to the tire engaging flanges for clamping engagement with the inner surface of a pneumatic tire bead.

4. The structure as defined in claim 3 wherein said transverse flange is convexly curved transversely on the outer surface thereof for generally conforming to the curvature of the inner surface of the tire.

5. The structure as defined in claim 3 together with an annular gasket of U-shaped cross-sectional configuration receiving the inner edge of the annular flange and disposed between the parallel portions of the tire engaging flanges thereby sealing the tire engaging flanges in relation to each other and in relation to the annular flange thereby sealing the pneumatic tire.

6. The structure as defined in claim 3 wherein said annular flange and transverse flange are rigid with each other and constructed of a plurality of segments.

7. The structure as defined in claim 3 together with a plurality of reinforcing flanges disposed perpendicularly to the annular flange and rigidly attached to the inner surface of the transverse flange.

8. In a safety vehicle wheel, the combination of a wheel rim having a pair of transversely spaced tire bead engaging flanges, a pneumatic tire mounted on said rim and having a pair of beads in engagement with the respective flanges thereof, an annular metallic flange disposed between the rim flanges in a plane parallel to the plane of wheel rotation, said annular flange having an inner edge portion secured to said rim and an outer edge projecting radially outwardly beyond the rim flanges, a transverse flange provided at the outer edge of said annular flange, said annular flange and said transverse flange being disposed wholly within said pneumatic tire with the transverse flange normally spaced inwardly from the tire tread region but supportably engageable with the tire tread region when the tire is deflated, and means provided on said annular flange and engaging said tire beads for maintaining the same in engagement with said rim flanges under both inflated and deflated conditions of said tire.

9. The combination as defined in claim 8 wherein said means include a set of circumferentially spaced reinforcing flanges projecting laterally from said annular flange and having inner edge portions in engagement with said tire beads.

10. The combination as defined in claim 9 together with angulated lips provided on said inner edge portions of said reinforcing flanges and also engaging said tire beads.

11. The combination as defined in claim 9 wherein said reinforcing flanges have outer edge portions secured to said transverse flange.

References Cited in the file of this patent

UNITED STATES PATENTS

| | | |
|---|---|---|
| 2,027,739 | Ledwinka | Jan. 14, 1936 |
| 2,165,810 | Paselk | July 11, 1939 |
| 2,775,282 | Kennedy | Dec. 25, 1956 |

FOREIGN PATENTS

| | | |
|---|---|---|
| 836,738 | France | Oct. 25, 1938 |